United States Patent [19]
Earhart

[11] 3,877,536
[45] Apr. 15, 1975

[54] SNOWMOBILE ENGINE COOLING MEANS

[76] Inventor: Thomas E. Earhart, 3751 Patterson Rd., Shelbyville, Mich. 49344

[22] Filed: Dec. 5, 1973

[21] Appl. No.: 422,025

[52] U.S. Cl. .............................. 180/5 R; 180/68 R
[51] Int. Cl. ........................................... B62m 27/02
[58] Field of Search .......... 180/5 R, 3 R, 1 G, 68 R; 123/41.43; 244/108

[56] References Cited
UNITED STATES PATENTS

| | | | |
|---|---|---|---|
| 2,582,858 | 1/1952 | Capiak | 180/3 R |
| 3,770,049 | 11/1973 | Wright | 165/51 |

Primary Examiner—Philip Goodman
Attorney, Agent, or Firm—Fay & Sharpe

[57] ABSTRACT

In a snowmobile type vehicle powered by a fluid cooled internal combustion engine, a heat exchanger is disposed on the top side of at least one of the snowmobile skis to facilitate continuous fluid cooling. The heat exchanger is comprised of tubular, heat conductive metal and defines a continuous fluid flow path. Coolant is continuously passed from the engine to the path inlet, circulated along the flow path to the path outlet and then returned to the engine for reuse. During circulation, engine heat absorbed by the coolant is removed therefrom by conductive and convective heat transfer due to the fact that the heat exchange tubular heat conductive material is exposed to the cooler atmospheric air as well as directly to the snow over which the vehicle travels. By this arrangement, the engine is easily and inexpensively cooled to achieve efficient vehicle operation.

18 Claims, 6 Drawing Figures

PATENTED APR 1 5 1975    3,877,536

SNOWMOBILE ENGINE COOLING MEANS

BACKGROUND OF THE INVENTION

This invention pertains to the art of vehicles and more particularly to vehicles powered by fluid cooled internal combustion engines.

The invention is particularly applicable to self propelled snow vehicles more commonly referred to as snowmobiles and will be described with particular reference thereto; however, it will be appreciated by those skilled in the art that the invention has broader applications and may be advantageously employed in other types of vehicles requiring the use of small, fluid cooled internal combustion engines.

It is known that the snowmobile type of vehicle has grown in popularity since the introduction of practical versions of such vehicles. Snowmobiles are variously employed for recreation and for performing useful work in otherwise difficult environmental circumstances and in providing a quick and efficient means of transportation over snow covered terrain. Originally, these vehicles were powered by air cooled two cycle type internal combustion engines. Although such engines initially proved satisfactory from a performance standpoint, the rapid increase in the number of snowmobiles operating within snow covered geographical areas rapidly increased. This increase was accompanied by substantial criticism of the vehicles per se not only from the standpoint of damage to the natural terrain but also from the fact that they were extremely noisy during operation. Such noise is deemed to be offensive not only to humans inhabiting those areas in which snowmobiles are operated but also to the various types and species of wildlife inhabiting these areas. The criticism leveled at snowmobiles in general eventually caused certain local and national legislatures to pass laws and ordinances focusing on regulating snowmobiles, including the noise levels permitted to be generated by such vehicles.

Inasmuch as air cooled engines require a continuous flow of air passed the engine cooling fins, the original snowmobile models variously had open ended shroud or hood areas so as to facilitate the necessary free flow of air while the snowmobile was in operation. Inasmuch as the operational noise levels for such vehicles had to be reduced by newly enacted laws, various manufacturers began to more fully enclose the engine area in an effort to retain some of the engine noise within the cowling or hood. This, of course, reduced the overall operational efficiency for the engines themselves. Since continuous air flow is necessarily required for properly cooling these engines, another effort was made in the area of developing adequate muffler systems to further reduce engine noise generated during vehicle operation. Such muffler systems focused on both the engine intake and exhaust areas. These efforts, however, have been somewhat stymied due to the fact that there is only a limited area within or on a snowmobile in which any muffler may be mounted. Thus, these muffler systems have not proved totally adequate to reduce vehicle noise during operation to at least the maximum level allowed by certain environmental laws. For example, some laws require that in the years 1973–74, snowmobile vehicles may not register more than 82 dbls. at a distance of 50 feet when in operation. In addition, these same laws then decrease the allowable decibel level to 74 dbls. at a distance of 50 feet by the year 1975.

For the above reasons, many snowmobile manufacturers have begun to employ fluid cooled internal combustion engines in order that the entire engine mount area may be more fully enclosed for retaining engine noise within the confines of the vehicle itself. The new problem thus developed is one of cooling the engine coolant itself during engine operation, which task is normally effected by a radiator type arrangement as, for example, an automobile. Here again, this type of arrangement necessarily requires a portion of the engine area to be opened to atmosphere during operation to facilitate a steady flow of air through the radiator. Further, conventional radiators require mounting space within the vehicle which is just not available unless the vehicle body is made unmanageably and/or undesirably large.

For the above reasons, alternate methods for cooling the engine coolant for fluid cooled internal combustion engines have been desired. Typical alternative arrangements thus far employed have comprised, for example, mounting a heat exchanger within the "tunnel" of the vehicle defined by the uppermost portion of the endless track and the lowermost portion of the frame. Cooling fluid is then continuously passed from the engine to the heat exchanger where air rushing through the tunnel operates to remove engine heat from the coolant. From the heat exchanger, the coolant is passed back to the engine for reuse in removing engine heat. Along with this primarily convection type heat transfer cooling, snow from the track is splashed or sprayed onto the heat exchanger to further remove heat from the coolant by conduction. However, in this type of heat exchanger the principal cooling is by convection and is not deemed to be significantly efficient for heavy duty or high engine speed operation. Further, foreign matter such as trash, sticks, etc. lying below the surface of the snow can be "kicked up" by the endless track and thrown against the heat exchanger so as to cause exchanger damage and possible loss of cooling fluid. Since these arrangements have been disposed in "hidden" areas, they are extremely difficult to get at should maintenance problems arise. This shortcoming is particularly magnified when operational problems occur in the field where only limited tools and equipment are available. Thus, an acceptable arrangement has not yet been developed for cooling fluid cooled internal combustion engines when employed in the snowmobile vehicle environment.

The present invention, however, contemplates new and improved method and apparatus which overcomes all of the above referred to problems and others and provides a new cooling method and means which are simple, economical, thermally efficient, readily adaptable to use with any snowmobile design and which facilitate ease of access for maintenance purposes.

BRIEF DESCRIPTION OF THE INVENTION

In accordance with the present invention, there is provided an improved conventional snowmobile which employs a fluid cooled internal combustion engine for powering the snowmobile. At least one of the snowmobile skis includes a heat exchanger structure with the exchanger having a fluid inlet and a fluid outlet adapted to be connected to the engine block cooling fluid outlet and cooling fluid inlet, respectively. The exchanger defines a continuous fluid flow path where engine heat is removed from the fluid as it passes therethrough.

In accordance with another aspect of the present invention, the heat exchanger structure is constructed from a heat conductive tube-like material and is located to extend generally longitudinally along a portion of the ski.

In accordance with a more limited aspect of the present invention, the tube-like structure is mounted on the top side of the ski to include elongated spaced apart side legs which are interconnected at their ends by cross-over legs.

In accordance with still another aspect of the present invention, a new snowmobile ski structure is provided which is particularly adapted for use with a snowmobile powered by a fluid cooled internal combustion type engine. A portion of the ski comprises a heat exchanger structure which is adapted to be connected to the engine for continuously receiving, circulating and cooling the engine cooling fluid.

In accordance with yet another aspect of the present invention, there is provided a method for cooling a fluid cooled internal combustion type engine when employed in a snowmobile vehicle. The method comprises the steps of:
 a. passing cooling fluid through the engine block to absorb engine heat;
 b. communicating the cooling fluid from the block to at least one of the snowmobile skis;
 c. circulating the cooling fluid through a heat exchanger comprising a portion of the one ski; and,
 d. returning the cooling fluid toward the engine for recirculation through the engine block.

The principal object of the present invention is the provision of new and improved method and apparatus for efficiently cooling the cooling fluid for an internal combustion engine as employed on a snowmobile.

Another object of the present invention is the provision of a new snowmobile engine cooling method and apparatus which is simple in design and construction.

Another object of the present invention is the provision of a new snowmobile engine cooling method and apparatus which is inexpensive to use.

Another object of the present invention is the provision of a new snowmobile engine cooling method and apparatus employing substantial conductive type heat transfer in operation.

Still another object of the present invention is the provision of a new snowmobile engine cooling method and apparatus which yields ease of access for maintenance and/or replacement purposes.

Yet another object of the present invention is the provision of a new snowmobile engine cooling method and apparatus which are protected from damage by foreign objects encountered beneath the surface of the snow during snowmobile travel.

Yet a further object of the present invention is the provision of a new snowmobile engine cooling method and apparatus which are versatile and may be readily adapted for use with any number of snowmobile designs.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 3 is a plan view of the ski structure shown in FIG. 2;

DESCRIPTION OF THE PREFERRED EMBODIMENT

Figure 1:
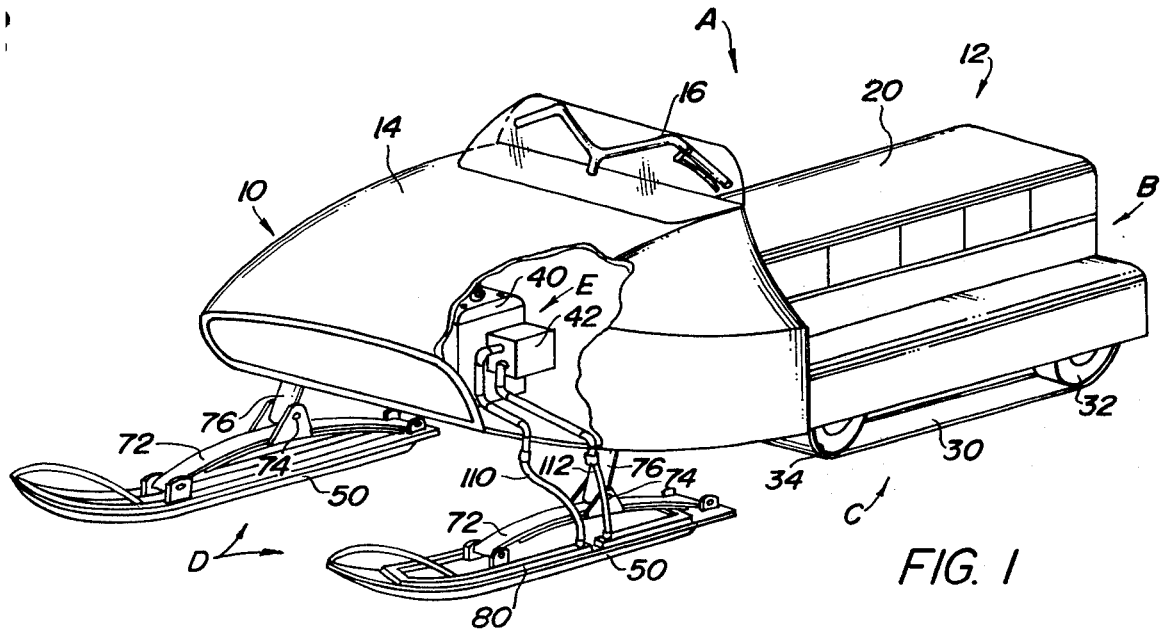
FIG. 1 is a perspective, partially cut away view of a snowmobile vehicle which shows the concepts of the subject invention mounted thereon.

Referring now to the drawings wherein the showings are for purposes of illustrating the preferred embodiment of the invention only and not for purposes of limiting the same, the FIGURES show a conventional snowmobile vehicle A having a frame B, traction or suspension unit C, ski assembly D and engine E.

More specifically, frame B includes a front portion 10 primarily supported by ski assembly D and a rear portion 12 primarily supported by traction or suspension unit C. The ski assembly and traction or suspension unit support the vehicle on a plane defined by the geographical terrain itself. Front portion 10 includes a cowling 14 normally of fiberglass or metal which substantially fully encloses engine E and a steering assembly generally designated 16 which conventionally operates to move the skis about the vehicle yaw axis to steer the vehicle as desired. It is understood that engine E is of the fluid cooled internal combustion type having a fluid cooled engine block 40 which receives and discharges a continuous flow of cooling fluid therethrough. This fluid is pumped through the block by conventional means such as a fluid pump 42 of a type deemed known.

Rear portion 12 includes a seat area 20 and usually a fuel tank (not shown). Traction or suspension unit C which supports this rear portion includes a continuous belt or track 30 engaged by spaced apart rear idler sprockets 32 and front idler sprockets 34. Conventionally, spaced apart drive sprockets (not shown) physically engage belt or track 30 to continuously drive the belt for propelling the vehicle itself. Drive sprockets 36, of course, are interconnected with engine E by conventional means.

It should be recognized, however, that the snowmobile vehicle shown in the drawings as well as the particular components described herein are not deemed to be limiting in nature and the components could be of other designs and the engine itself could be and often is relatively positioned at other areas of the vehicle.

Figure 2:
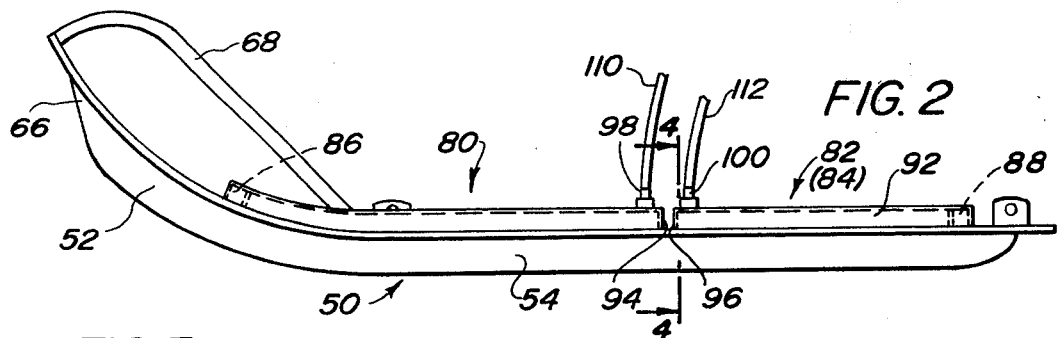
FIG. 2 is a side elevation of a snowmobile ski which incorporates the concepts of the subject invention therein.
Figures 4, 5, 6:
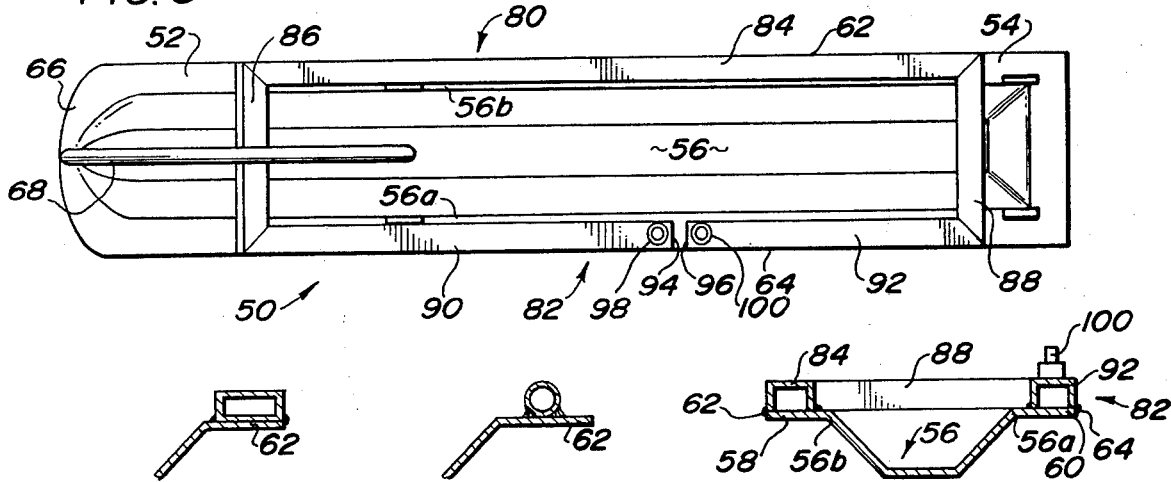
FIG. 4 is a cross sectional view of the ski structure shown in FIG. 2 taken along lines 4—4; and, FIGS. 5 and 6 show alternate arrangements for the heat exchanger arrangement of the subject invention.

Ski assembly D is comprised of a pair of substantially identical elongated skis generally designated 50. Inasmuch as these skis are substantially identical, reference will hereinafter be made to a description of one of these skis, it being understood that this description is equally applicable to both. Ski 50, as best shown in FIGS. 2, 3 and 4, includes an arcuate front or lead section 52 and a rear or main body section 54. The skis act to support the front of the vehicle on a plane defined by the surface of the terrain over which the vehicle travels. FIG. 4 shows a cross-section of the ski as having a generally V-shaped configuration 56. This configuration may, of course, vary somewhat without departing from the intent and scope of the present invention, such deviations being determined by the manufacturer design and/or the normal intended use of the vehicle. Disposed at the outermost edges 56a and 56b of the legs of the generally V-shaped configuration are spaced apart, oppositely outward extending side flanges 58,60 having outermost side edges 62,64 respectively.

Generally, the V-shaped configuration, including side flanges 58,60, extends substantially over the entire length of the ski and tapers toward nose 66 at the outermost end of front or lead section 52. This lead section may also include a conventional strengthening member 68 extending from nose 66 to substantially the transition area between sections 52,54. Ski 50 is normally manufactured from a heavy gauge steel or other metal so as to withstand the constant shock of terrain travel and of contacting foreign objects disposed beneath the surface of the snow. Ski 50 may be mounted to front portion 10 of frame B by a number of convenient means. In the embodiment shown, an arcuate leaf spring 72 connected at the end points to the front and rear areas of main ski section 54, is pivotally connected at 74 to steering linkage generally shown as 76 to facilitate movement of the ski relative to the pitch axis of the vehicle. Of course, movement of steering assembly 16 causes a corresponding movement of the pair of skis 50 in order that the vehicle may be steered as desired. Likewise, the engine controls are normally mounted on steering assembly 16 as, for example, at a handle bar arrangement disposed at the uppermost end of the steering assembly.

Although both skis 50 of the pair of skis are normally identical in structure, a slight variance as to at least one of the skis which incorporates the concepts of the subject invention will now be hereinafter described. At least one ski 50 includes a heat exchanger generally designated 80 thereon. In the preferred embodiment of the invention here under discussion, this heat exchanger comprises an elongated, closed fluid flow path established by a hollow tubular member extending over a portion of the ski. The tubular member is defined by a pair of side legs 82,84 interconnected by a pair of cross-over legs 86,88 at the longitudinal ends thereof. More specifically, side leg 82 is comprised of a pair of tubular side leg sections 90,92 having adjacent, opposed closed ends 94,96 respectively. These side leg sections are mounted to the ski along flange 60 adjacent edge 64 and extend longitudinally over a portion of both the lead and main sections 52,54 of the ski. At the front area of this structure, cross-over leg 86 connects side leg section 90 with side leg 84 which, in turn, extends longitudinally over a portion of the upper surface of flange 62 at both lead and main section 52,54. Adjacent the rear end of the main body section, cross-over leg 88 connects side leg 84 with side leg section 92 of side leg 82. Side legs 82,84 are disposed immediately adjacent side edges 64,62 to assure maximum leg contact with both the atmosphere and the snow for reasons which will hereinafter be described.

Disposed in leg section 90 adjacent closed end 94 is a fluid inlet/outlet 98 and disposed in leg section 92 adjacent closed end 96 is a fluid outlet/inlet 100. These inlets or outlets are adapted to be conveniently affixed by fluid carrying means such as a sheathed fluid hose to block 40 of engine E by means of conventional fluid coupling members. In the preferred embodiment of the invention here under discussion, heat exchanger 80 is constructed from a known heat conductive material such as, for example, aluminum, for reasons which will become apparent hereinafter. Of course, other materials may be advantageously employed without departing from the intent or scope of the present invention. The various structural legs which comprise the heat exchanger may be fabricated from aluminum stock so as to have a generally square cross-sectional configuration as shown in FIGS. 2, 3 and 4 or a rectangular cross-sectional configuration as shown in FIG. 5. In the FIGS. 2, 3 and 4 embodiment, at least side legs 82,84 have a generally V-shaped cross-sectional configuration, that is, channel shaped, with a portion of flanges 58,60 forming the bottom wall of the continuous fluid flow path. Likewise, these legs could be constructed from extruded aluminum bars to take the cross-sectional configurations shown in FIGS. 2–5 or the generally round cross-sectional configuration shown in FIG. 6. These various structural legs are rigidly affixed to ski 50 by convenient means such as, for example, welding. The heat exchanger structure thus variously described defines a continuous flow path extending from one of the inlets/outlets continuously through the side and cross-over legs and back out of the other inlet/outlet. It should also be noted that in the preferred embodiment of the present invention, the heat exchanger is disposed on the upper surface of flanges 62,64 so as not to act as a direct support for the vehicle structure on the snow covered terrain. Such support is, however, provided directly by the lower surfaces of the flanges and the outside surface of the generally V-shaped portion 56.

In the preferred embodiment of the arrangement here under discussion and with particular reference to FIGS. 1, 2 and 3, the cooling fluid outlet for engine block 40 at pump 42 is connected to a fluid carrying flexible cable or hose 110, preferably sheathed, and to fluid inlet/outlet 98 by conventional fluid coupling means. Similarly, fluid outlet/inlet 100 is connected by means of a similar hose or cable 112 to the fluid inlet of engine block 40 at pump 42. For purposes of vehicle asthetics as well as for purposes of protecting the hoses, they may conveniently pass through the bottom of the vehicle frame and cowling at a position immediately adjacent the ski 50 which carries heat exchanger 80. Further, a combination of tubing or pipe and hose or cable may be conveniently employed. It is only necessary that the fluid connections between the ski and engine do not interfere or restrict steering of the vehicle.

Description will hereinafter be made to use of the subject invention. During engine operation, coolant is conventionally continuously passed through engine block 40 for engine cooling purposes. From the block outlet at the pump, the hot cooling fluid passes downwardly through cable or hose 110 and into the heat exchanger at inlet 98. The fluid then passes along the continuous flow path defined by legs 82,84,86 and 88, outwardly of outlet 100 and back to engine block 40 via cable 112 for recirculation through the engine. The cooling fluid, of course, passes continuously along this path as long as the snowmobile engine is operative. During coolant passage through the heat exchanger, heat is removed from the coolant in order that it may return to the engine and remove additional engine heat. Since the heat exchanger is mounted directly on one of the skis, it is in constant contact with the cold atmospheric air and usually in contact with the snow itself, particularly when the snowmobile is moving across snow covered terrain. Even though the heat exchanger is mounted on the top of the ski for protective purposes, that portion of the ski is normally in direct contact with the snow during vehicle operation. Thus, and inasmuch as the heat exchanger is constructed from good heat conductive material, snow, contacting the heat exchanger acts to remove heat therefrom by conductive type heat transfer which is extremely desirable and efficient. When the snowmobile is at a standstill with the engine running, engine heat will be removed from the heat exchanger by convective type heat transfer which is ordinarily sufficient under the circumstances. With the arrangement hereinabove described, more efficient cooling for the engine is realized than heretofore possible with other arrangements wherein direct contact with snow is not particularly efficient inasmuch as such contact is only created by snow splash emmulating, for example, from the tread as the snowmobile traveled over the terrain.

Another structural arrangement contemplated in practicing the concepts of the subject invention is locating heat exchanger 80 within generally V-shaped area 56 of ski 50. That is, area 56 may be conveniently configured to receive the heat exchanger disposed inboard of spaced apart areas 56a, 56b. This particular arrangement provides greater protection for the heat exchanger during vehicle operation while still allowing for efficient heat removal since snow is in continuous contact with that portion of the ski during such contact. Likewise, it would be possible to enclose the heat exchanger within or make it an integral part of the ski if so desired. However, such an arrangement would normally require at least one rather specialized ski structure. The differences here are only in the particular location of the heat exchanger relative to the ski itself and do not in any way depart from the intent or scope of the invention as hereinabove described with reference to the FIGURES.

In addition to the arrangement hereinabove described and if desired to arrive at greater cooling characteristics, particularly for example, as with larger engines normally operating at higher rpms, for heavy duty work or for racing purposes, it is entirely possible and within the scope of the present invention to install a heat exchanger 80 on each of skis 50 which comprise ski assembly D. These heat exchangers may then be conveniently interconnected by conventional means with each other and with the engine block itself in order that desired cooling may be effected.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. In a motorized snow vehicle including a frame; a traction means secured to said frame generally centrally thereof and supporting said frame; a pair of elongated skis each having a front lead section and a main body section with said skis mounted beneath said frame adjacent the front portion thereof and movable between a normal position with said skis extending parallel to the longitudinal axis of said frame and positions angularly disposed thereto for steering said vehicle on a generally planar surface; and, a fluid cooled internal combustion engine secured to said frame for driving said traction means, the improvement comprising:

at least one of said pair of skis including a heat exchanger structure defining a continuous fluid flow path extending longitudinally along a portion of the main body portion of said at least one ski, said heat exchanger including an exchanger inlet and an exchanger outlet adapted to be connected to the engine block cooling fluid outlet and the engine block cooling fluid inlet respectively wherein engine cooling fluid passing through said engine enters said exchanger inlet, travels through said exchanger discharging heat thereto collected from said engine and returns to said engine from said exchanger outlet for recycling therethrough.

2. The improvement as defined in claim 1 wherein said fluid flow path extends longitudinally along a portion of both said lead and main body sections of said at least one ski.

3. The improvement as defined in claim 1 wherein said one ski has spaced apart outermost side edges, said continuous fluid flow path extending longitudinally adjacent a portion of each of said edges.

4. The improvement as defined in claim 1 wherein said one ski has a generally V-shaped cross section, said continuous fluid flow path extending longitudinally within a portion of said V-shaped configuration.

5. The improvement as defined in claim 1 wherein said heat exchanger comprises a hollow tube-like structure constructed from heat conductive material to have an exchanger fluid inlet disposed adjacent one end and an exchanger fluid outlet disposed adjacent the other end.

6. The improvement as defined in claim 5 wherein said tube-like structure is elongated to extend longitudinally along at least a portion of said one ski.

7. The improvement as defined in claim 5 wherein said one ski has spaced apart outermost side edges, said tube-like structure including an elongated side leg disposed generally coextensive with a portion of each of said edges and interconnected with each other.

8. The improvement as defined in claim 7 wherein said exchanger fluid inlet and outlet are both disposed in the same one of said side legs, said side legs being connected to each other by cross-over legs disposed at the outermost ends thereof.

9. The improvement as defined in claim 5 wherein said one ski has a generally V-shaped cross section, said tube-like structure being disposed within said generally V-shaped configuration.

10. A ski structure for particular use in a snow vehicle of the type powered by a fluid cooled internal combustion engine and wherein at least one ski supports the front end of said vehicle on a planar surface with said at least one ski being movable between a first position generally parallel to the longitudinal axis of said vehicle and positions angularly disposed thereto for steering said vehicle over said planar surface, said ski structure comprising:

a narrow elongated rigid member having an arcuate lead section and a main body section; at least a portion of said main section comprising a heat exchanger defining a continuous fluid flow path extending longitudinally along at least a portion of said main body section; an exchanger fluid inlet; and, an exchanger fluid outlet, said exchanger inlet and outlet including means for placing them in communication with the engine block cooling fluid outlet and inlet, respectively.

11. The ski as defined in claim 10 having spaced apart outermost side edges, said fluid flow path extending along a portion of said each edge.

12. The ski defined in claim 10 having a generally V-shaped cross section, said continuous fluid flow path extending longitudinally within a portion of said V-shaped configuration.

13. The ski as defined in claim 10 wherein said heat exchanger comprises a hollow tube-like structure constructed from heat conductive material.

14. The ski as defined in claim 13 wherein said tube-like structure extends longitudinally along at least a portion of said ski.

15. The ski as defined in claim 14 wherein said tube-like structure is mounted on the opposite side of said ski from that side contacting said planar surface.

16. The ski as defined in claim 14 having spaced apart outermost side edges, said tube-like structure having an elongated side leg disposed adjacent a portion of each said side edge and interconnected with each other.

17. The ski as defined in claim 16 wherein said exchanger inlet and outlet are disposed in the same one of said side legs, said side legs being connected to each other by cross-over legs disposed at the ends thereof.

18. The ski as defined in claim 14 wherein having a generally V-shaped cross section, said tube-like structure being disposed within said generally V-shaped configuration.

* * * * *